(12) United States Patent
Richter

(10) Patent No.: US 10,906,734 B2
(45) Date of Patent: Feb. 2, 2021

(54) WASTE WATER CONTAINER

(71) Applicant: Bodo Richter, Bad Honnef (DE)

(72) Inventor: Günter Richter, Altenkirchen (DE)

(73) Assignee: Bodo Richter, Bad Honnef (DE)

( * ) Notice: Subject to any disclaimer, the term of this patent is extended or adjusted under 35 U.S.C. 154(b) by 86 days.

(21) Appl. No.: 16/317,217

(22) PCT Filed: Jul. 18, 2017

(86) PCT No.: PCT/EP2017/068106
§ 371 (c)(1),
(2) Date: Jan. 11, 2019

(87) PCT Pub. No.: WO2018/015377
PCT Pub. Date: Jan. 25, 2018

(65) Prior Publication Data
US 2019/0300277 A1    Oct. 3, 2019

(30) Foreign Application Priority Data

Jul. 21, 2016    (DE) ............. 10 2016 113 442

(51) Int. Cl.
| | |
|---|---|
| *E03F 5/10* | (2006.01) |
| *B65D 90/08* | (2006.01) |
| *B29C 49/04* | (2006.01) |
| *B29C 65/56* | (2006.01) |
| *B65D 88/76* | (2006.01) |

(Continued)

(52) U.S. Cl.
CPC .......... *B65D 90/08* (2013.01); *B29C 48/0017* (2019.02); *B29C 49/04* (2013.01); *B29C 65/56* (2013.01); *B65D 88/76* (2013.01); *E03F 5/10* (2013.01); *B29C 51/08* (2013.01); *B29K 2023/06* (2013.01); *B29L 2031/712* (2013.01); *Y02A 20/00* (2018.01)

(58) Field of Classification Search
CPC .... B65D 47/00; B65D 47/125; B65D 47/145; B65D 41/06; B65D 21/0228; B65D 39/10; B65D 43/168; B65D 45/305; B65D 41/08; B65D 45/325; B65D 90/08; B65D 88/76; E03F 5/10; B29C 48/0017; B29C 49/04; B29C 65/56; B29C 51/08; Y02A 20/104; Y02A 20/106; Y02A 20/102; B29K 2023/06; B29L 2031/712
USPC ......... 220/315, 319, 324, 567.1, 849, 345.6, 220/657; 215/273, 274; 292/256.6
See application file for complete search history.

(56) References Cited

U.S. PATENT DOCUMENTS

| | | | | |
|---|---|---|---|---|
| 2,562,111 | A | * | 7/1951 | Michel ............... B65D 45/305 222/402.11 |
| 3,915,336 | A | * | 10/1975 | Spreng ............... B65D 45/32 220/284 |

(Continued)

FOREIGN PATENT DOCUMENTS

| | | |
|---|---|---|
| DE | 29503546 U1 | 7/1995 |
| WO | 2004026711 A1 | 4/2004 |

*Primary Examiner* — Kareen K Thomas
(74) *Attorney, Agent, or Firm* — Young Basile Hanlon & MacFarlane, P.C.

(57) ABSTRACT

A container made of plastic and having a receiving volume of 2000 to 10000 liters comprises an upper container part and a lower container part and at least one clamping device which connects the two container parts in a sealing manner. Further, a plastic blow molding process is described, which serves to produce the container.

13 Claims, 7 Drawing Sheets

(51) Int. Cl.
   *B29C 48/00* (2019.01)
   *B29L 31/00* (2006.01)
   *B29C 51/08* (2006.01)

(56) References Cited

U.S. PATENT DOCUMENTS

| | | | |
|---|---|---|---|
| 5,129,537 A * | 7/1992 | Bordner | B65D 45/345 |
| | | | 220/320 |
| 5,361,930 A | 11/1994 | Perry | |
| 5,421,473 A * | 6/1995 | McCrossen | B65D 81/34 |
| | | | 220/319 |
| 5,605,244 A * | 2/1997 | Bradshaw | B65D 43/0229 |
| | | | 220/298 |
| 5,785,201 A * | 7/1998 | Bordner | B65D 43/0218 |
| | | | 206/508 |
| 5,947,320 A * | 9/1999 | Bordner | B65D 43/0218 |
| | | | 220/321 |
| 7,735,668 B2 | 6/2010 | Richter | |
| 8,740,005 B1 | 6/2014 | Holbrook et al. | |
| 8,870,013 B2 * | 10/2014 | Alvares | B65D 43/0249 |
| | | | 220/319 |
| 9,669,969 B2 * | 6/2017 | Taylor | B65D 45/345 |
| 2013/0037544 A1 * | 2/2013 | Brandt | B65D 45/345 |
| | | | 220/321 |

* cited by examiner

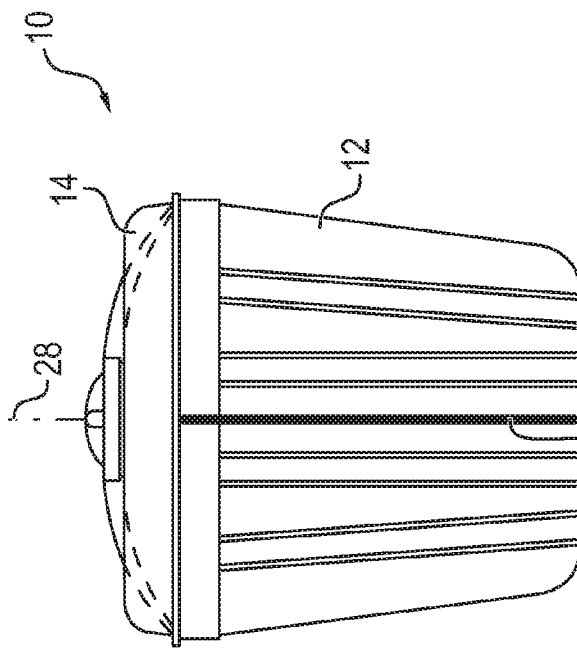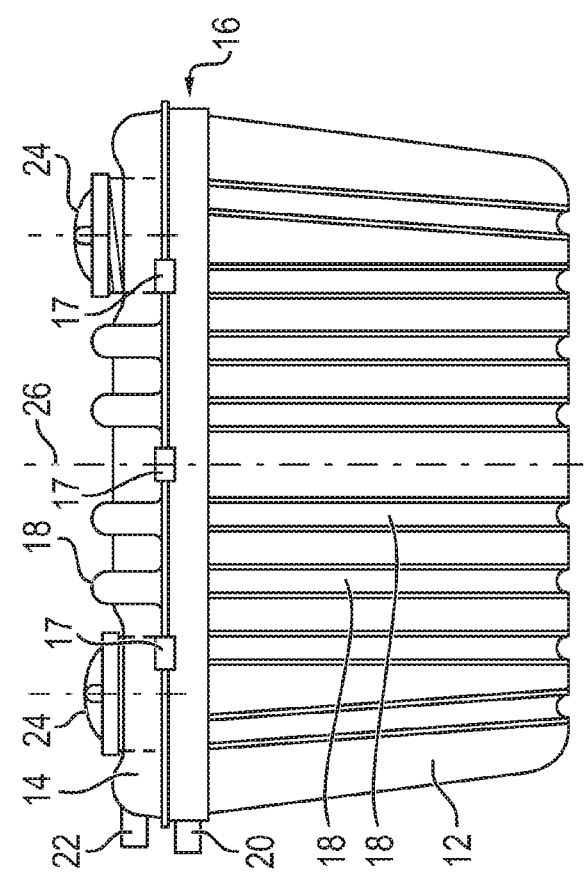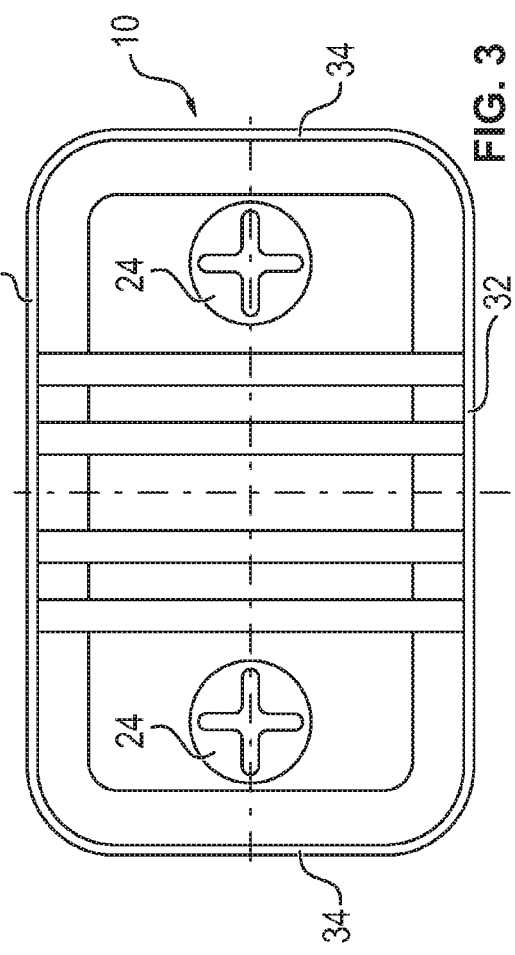

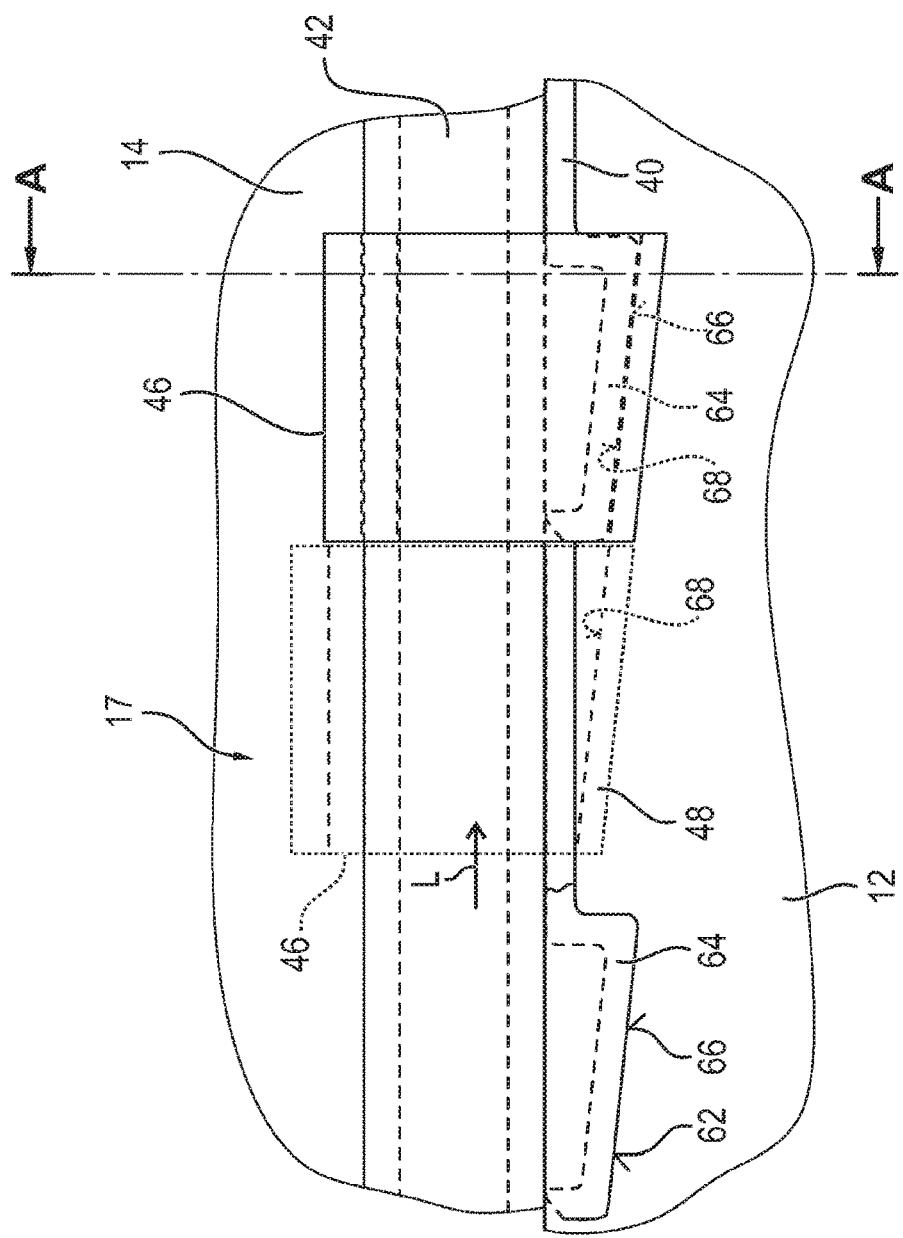
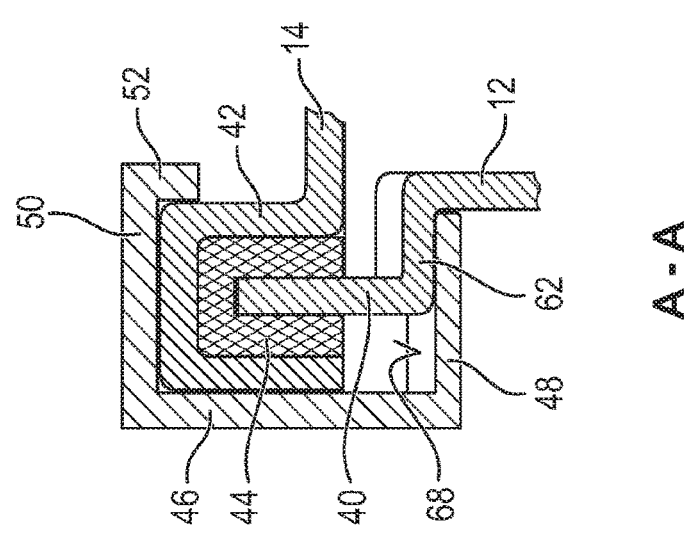
FIG. 7

WASTE WATER CONTAINER

The invention relates to a container made of plastic and having a receiving volume of 2000 to 10000 liters, in particular a waste water container. Such a container consists of an upper container part and a lower container part which are connected to each other in a sealing manner by several clamping devices along the separating line between the two container parts. Further, the invention relates to a method for producing such a container.

BACKGROUND

Similar containers of this type, but with a smaller capacity are known from the prior art, the container being produced from two container parts in a plastic injection molding process. In this manufacturing process, a connecting flange is integrally formed on each container part. Here, the injection molding process offers the possibility of forming reinforcing ribs, different wall thicknesses, centering pins etc. on the container parts in one production step. What is disadvantageous is that the dimensions of the container parts are significantly limited to small capacities for reasons of the production possibilities using injection molding machines. For large volume ranges, thus two identically large container parts are produced which are connected using joining techniques. In this case, the container flanges at which the two container parts are joined in a sealing manner are always in the liquid area so that the expense for a liquid-tight joining technique is relatively high. Further, the costs for an injection molding machine and for injection molding tools are high, which is clearly reflected in the production costs, in particular also because two working steps are required for each container to be produced.

SUMMARY OF THE INVENTION

It is the object of the invention to specify a container made of plastic, in particular a waste water container, as well as a production process thereof, which container is easy to produce economically at a high product quality and where the associated production process is very economical.

This object is solved for a container made of plastic, in particular of polyethylene, by the features of claim 1. Advantageous developments are specified in the dependent claims.

The inventive container made of plastic has a capacity of 2000 l to 10000 l and consists of an upper container part and a lower container part. At least one clamping device, typically several, connects the two container parts with one another in a sealing manner, wherein a circumferential L section projecting from the container wall of the one container part engages with an associated circumferential U section of the other container part.

The L section of the one container part and the U section of the other container part are integrally formed when forming the plastic material and constitute the essential connecting element for a liquid seal. The at least one clamping device or several clamping devices fix the two container parts so that a stable, high-quality liquid seal is formed.

According to a development, a seal having a U-shaped cross-section or a toroidal sealing or an O-shaped ring sealing is arranged between the L section and the U section. In this way, upon clamping with the respective clamping device a reliable liquid seal is formed.

The clamping device comprises a preferably U-shaped clamping bracket with a first leg and a second leg, wherein an end of the first leg encompasses the underside of the L section and an end of the second leg encompasses the U section of the other container part. In this way, the two container parts are fixed to each other in an aligned manner along their flanges by the clamping device.

It is advantageous when a clamping element, preferably an angular section, movable relative to the U section is arranged between the second leg and the U section, the clamping element having a wedge-shaped clamping surface interacting for clamping with a wedge-shaped clamping surface formed on the second leg. In this way, by moving the clamping element or the angular section a clamping force which guarantees that the two container parts are joined to each other in a liquid-tight manner can be set.

In another alternative embodiment, the underside of the circumferential L section may have at least one projection, conveniently several projections at predetermined intervals along the L section, with one wedge-shaped clamping surface each, interacting upon clamping with a wedge-shaped clamping surface that is formed on the inside of the first leg of the clamping bracket. When moving the clamping device in circumferential direction, thus a clamping force is set providing a high-quality liquid sealing.

It is advantageous when both container parts are produced by blow molding, rotational molding or thermoforming (plastic deep drawing). Here, both container parts can be produced simultaneously in one single operation with large capacities.

According to a further aspect of the invention, a blow molding process for producing a container made of plastic, in particular a waste water container, is specified. This manufacturing process in which the upper container part and the lower container part are produced simultaneously in one single blow mold is highly economical and allows the production of a large-volume container. The technical advantages that can be achieved with this manufacturing process correspond to those already mentioned further above in connection with the container made of plastic.

BRIEF DESCRIPTION OF THE DRAWINGS

Embodiments of the invention are hereinafter explained with reference to the Figures.

FIG. 1 shows a waste water container in a front view.

FIG. 2 shows the waste water container according to FIG. 1 in a side view.

FIG. 3 shows a top view of the container according to FIG. 1.

FIG. 7 shows an alternative embodiment for clamping together the lower container and the upper container using projections.

DETAILED DESCRIPTION OF ILLUSTRATIVE EMBODIMENTS

Figure 4:
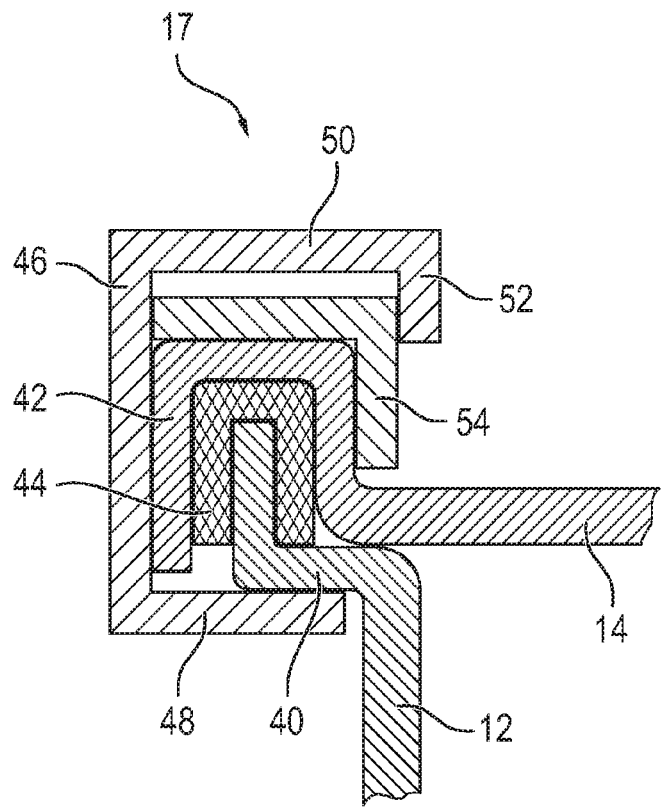
FIG. 4 shows a sectional view of a clamping device which connects portions of the lower container with portions of the upper container.

FIG. 1 shows a container 10 in a front view, which container is used as a waste water container and can for example also be buried invisibly in the earth in the state of use. The container 10 consists of a lower container 12 and an upper container 14, which are joined to each other in a watertight manner in a flange area 16 by way of several clamping devices 17. The container 10 comprises stiffening beads 18 improving the mechanical stability of the container 10 made of plastic material, preferably polyethylene. The liquid level in the state of use of the container 10 lies below the flange 16. Below this flange 16, an overflow element 20 is arranged in the lower container 12 and a feed element 22 is arranged in the upper container 14 above the flange 16. Further, in the upper container 14 closing elements 24 for closing openings in the upper container 14 are provided. The container 10 is designed symmetrically with respect to a symmetrical line 26.

FIG. 2 shows the container according to FIG. 1 in the side view. Same elements are identified in this Figure and in the further Figures with the same reference signs. The container 10 is preferably produced by blow molding, wherein along the line of symmetry 28 a pinch-off seam 30 extends along the narrow side of the lower container 12.

FIG. 3 shows a top view of the container 10 according to FIGS. 1 and 2. The lower container 12 comprises conically extending longitudinal walls 32 and conically extending side walls 34.

FIG. 4 shows a sectional view of the clamping device 17 joining portions of the lower container 12 with portions of the upper container 14. The container wall of the lower container 12 terminates in a circumferential projecting L section 40 and the container wall of the upper container 14 terminates in a circumferential U section 42. A U-shaped sealing 44 is arranged between the L section 40 and the U section 42. The clamping device 17 comprises a U-shaped clamping bracket 46 with a first leg 48, the end of which engages with its end below the underside of the L section 40. A second leg 50 of the clamping bracket 46 engages over the U section 42 of the upper container 14. At the end of the leg 50, a nose rib 52 is formed which engages over the angular section 54 arranged between the U section 42 and the clamping bracket 46, said angular section serving as a clamping element. The angular section 54 bears with its inside surface against the U section 42, at the basis thereof and against one of its legs.

Figure 5:
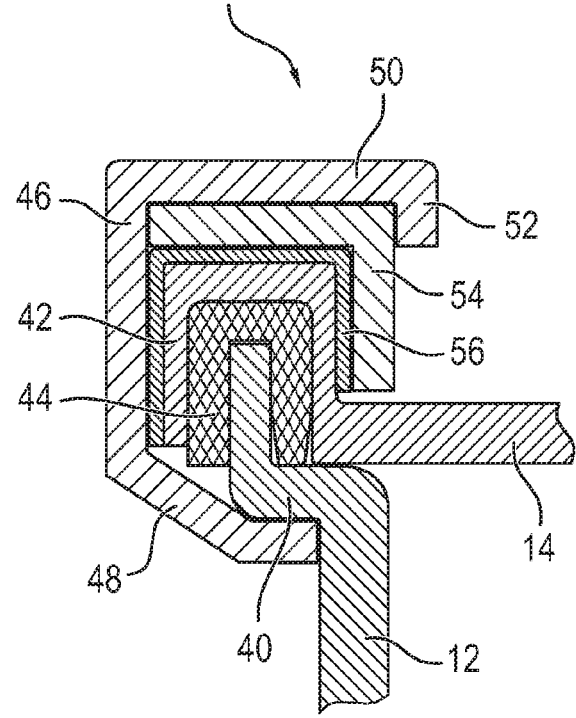
FIG. 5 shows an alternative embodiment of a clamping device.

FIG. 5 shows an alternative embodiment in which the clamping bracket 46 deviates from the U shape in that the second leg 48 is wide open to support the underside of the L section 40. The U section 42 is covered by a reinforcing section 56 made of plastic or metal and thus increases the mechanical stability upon clamping together with the aid of the angular section 54.

Figure 6:
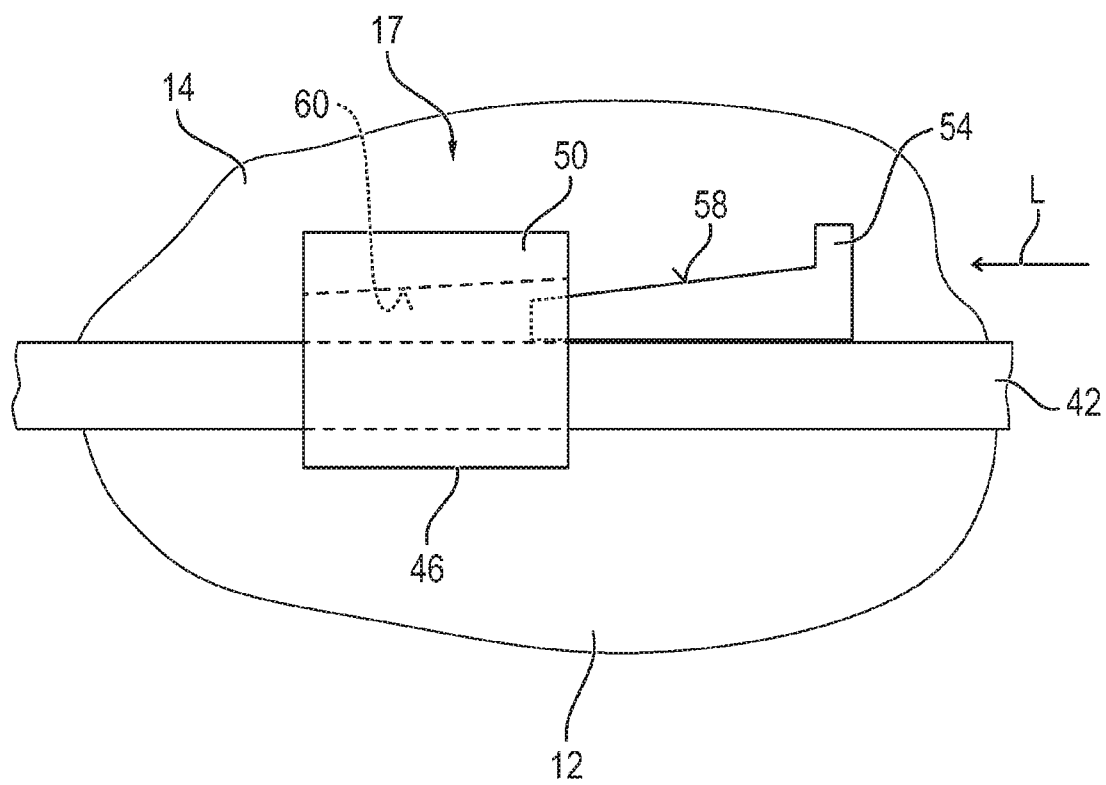
FIG. 6 shows a front view of the clamping device in interaction with an angular section.

FIG. 6 shows a front view of the clamping device 17 and illustrates the clamping operation using the angular section 54 in connection with FIG. 4. The angular section 54 has a wedge-shaped clamping surface 58 interacting with a wedge-shaped clamping surface 60 formed on the leg 50 when displacing the angular section 54 in the direction L upon clamping. The underside of the angular section 54 presses against the basis of the U section 42.

FIG. 7 shows an alternative embodiment for clamping together the lower container 12 and the upper container 14. In FIG. 7, a sectional view is illustrated on the left-hand side and a front view of the clamping device 17 is illustrated on the right-hand side. The underside 62 of the L section 40 comprises, at predetermined intervals, projections 64 with wedge-shaped clamping surfaces 66. These clamping surfaces 66 interact with a wedge-shaped clamping surface 68 which is formed on the inside of the leg 48 of the clamping bracket 46. For clamping, the clamping bracket 46 is moved in longitudinal direction L, wherein by means of the inclined ramps of the clamping surfaces 66 and 68 the clamping takes place. The conical projections 64 are present at intervals that are larger than the length of the respective clamping device 17, wherein also the length of the respective projection 64 is larger than the length of the clamping device 17.

Figure 8:
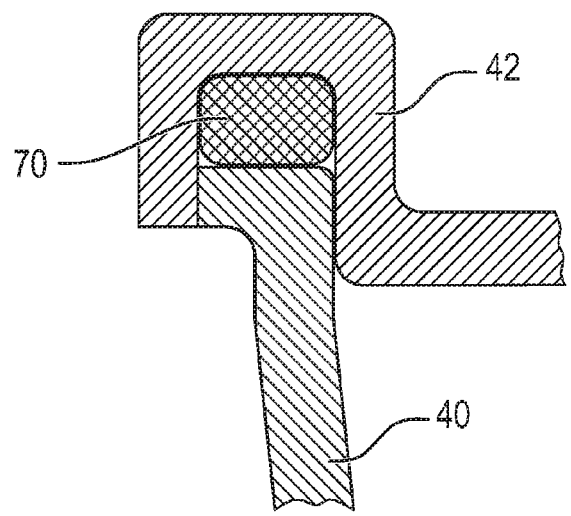
FIG. 8 shows an alternative embodiment for the U section and the L section with a toroidal sealing.
Figure 9:
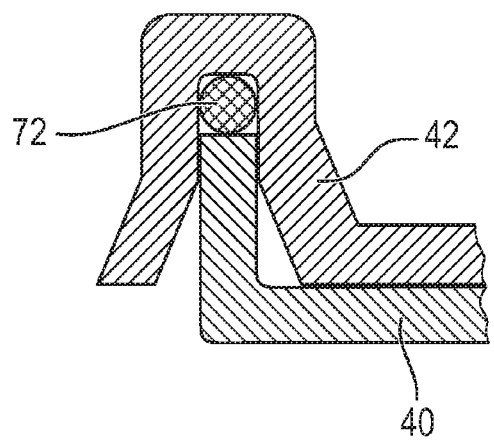
FIG. 9 shows an alternative embodiment with an O-ring as a sealing.
Figure 10:
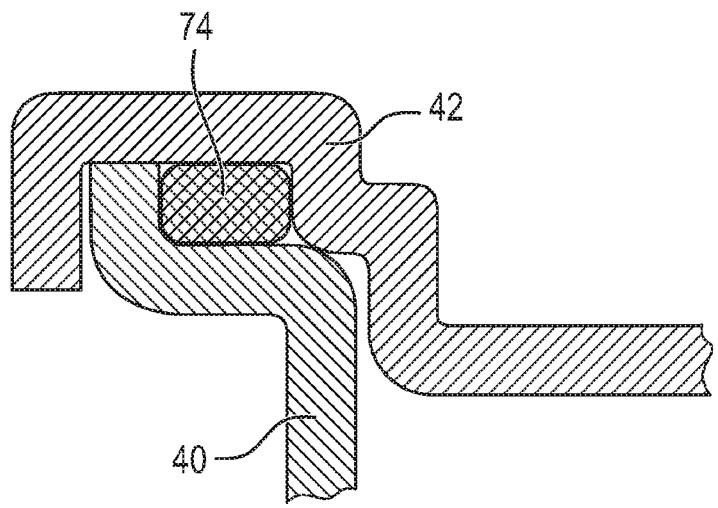
FIG. 10 shows an alternative embodiment with a rectangular O-ring.
Figure 11A:
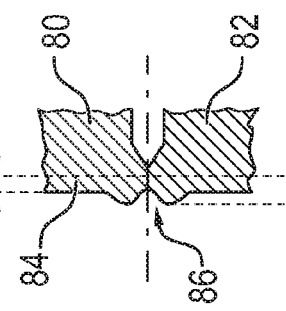
FIG. 11 shows a schematic diagram for explaining blow molding.
Figure 11D:
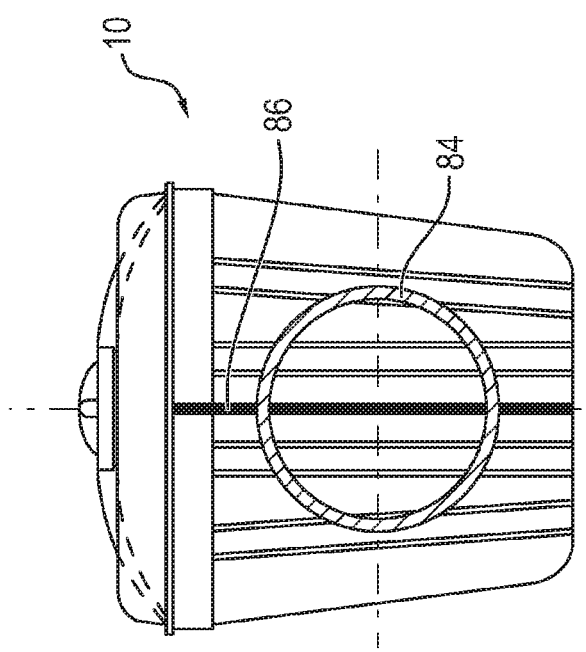
Figure 11C:
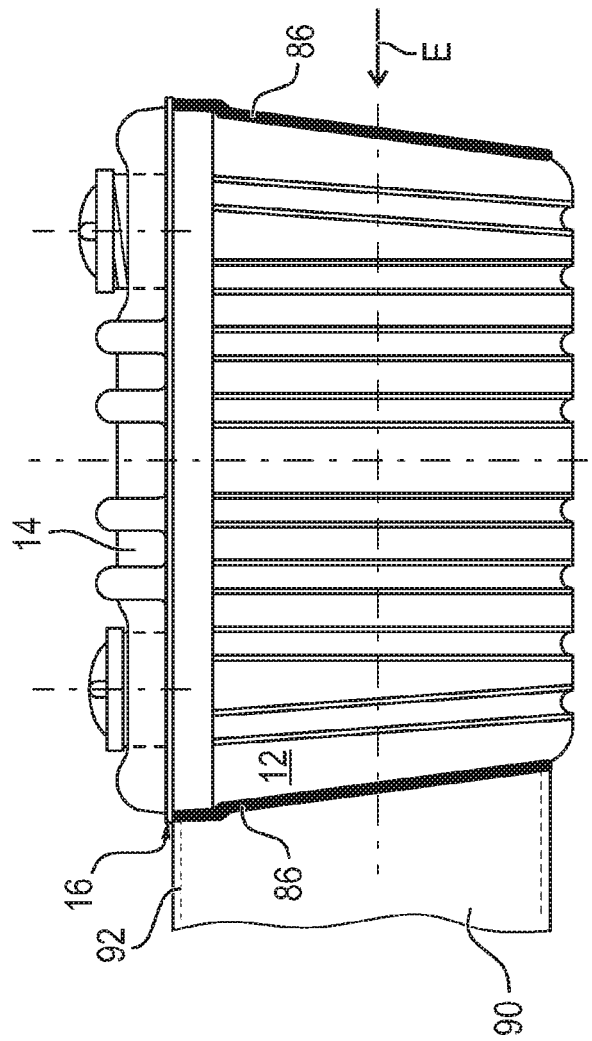
Figure 11B:
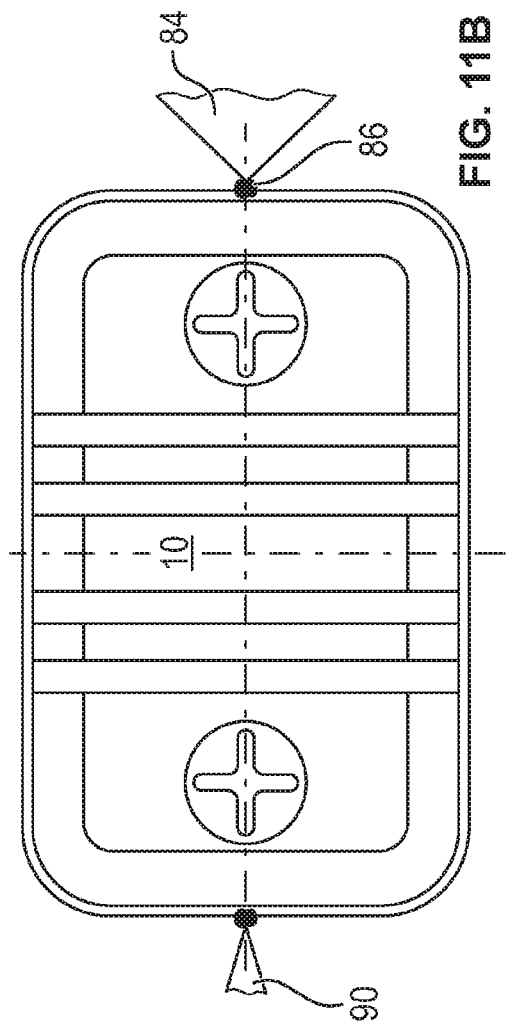

FIGS. 8 to 10 show alternative embodiments for the U section 42 and the L section 40 as well as the sealings arranged in-between. In FIG. 8, a toroidal sealing 70 having a rectangular cross-section is illustrated. The L section 40 penetrates with its end into the U section 42. In FIG. 9, the U section 42 has a maul-shaped opening in cross-section, into which the end of the L section penetrates. Between the L section 40 and the U section 42 an O-ring 72 is arranged for sealing. In FIG. 10, the U section 42 has a gooseneck in cross-section. The L section 40 projects into this gooseneck and with a bent end section into the U shape of the U section 42. A toroidal sealing 74 that is rectangular in cross-section is arranged between the U section 42 and the L section 40.

The container 10 can be manufactured by plastic rotational molding, thermoforming or blow molding. In the case of rotational molding, a thermoplast in powder form is heated in a hollow body mold, wherein one plastic layer after the other plastic layer deposits on the inside surfaces of the hollow body mold. In this way, hollow bodies with volumes up to 6000 l can be produced.

In the case of plastic thermoforming (also referred to as warm forming, deep drawing or vacuum deep drawing) rolled goods or plate goods made of plastic are brought into the desired shape by thermoforming, wherein the upper container and the lower container are produced separately from each other and are connected later on in a sealing manner with the aid of the clamping devices.

Particularly advantageous is the production of the container by plastic blow molding and in particular by extrusion blow molding. Here, by extrusion a tubular preform is produced which is transferred to a blow mold and therein adapted to the inner contours of the blow mold by internal pressure and/or a vacuum. A substantial characteristic is a pinch-off seam of the hollow body produced in this way.

FIG. 11 shows in a schematic diagram with sections A, B, C, D the blow molding of the container 10, wherein the lower container 12 and the upper container 14 are produced simultaneously in a two-part blow mold. In section A, a left-hand blow mold half 80 and a right-hand blow mold half 82 are illustrated in cross-section in the closed state. The preform 84 included in the blow mold forms a pinch-off seam 86 at the separation between the mold halves 80, 82. This pinch-off seam 86 has a thickness W1, which is larger than the wall thickness W2 which is the usual wall thickness of the blown article.

In section B, it can be seen that after pinching off the preform 84 an upper slug 88 and a lower slug 90 are present on the container 10, which are cut off from the container 10 as residual material. In this area, there remains a thickening, the pinch-off seam (also called pinch line). In section C, the container is illustrated in the side view with the lower pinch-off seam and the upper pinch-off seam 86 with respect to the direction of extrusion E. The length of the pinch-off seam 86 is dimensioned such that it terminates in the later flange area 16, i.e. on the separating line between lower container 12 and upper container 14 (see also FIG. 1).

In section D, the container 10 is illustrated in a front view of its narrow side. Also entered is the preform 84, which is tubular in cross-section, as fed to the mold halves 80, 82, wherein, by pinching off, the pinch-off seam 86 is formed on the narrow front surfaces (see also FIG. 2).

After the container 10 has cooled down in the mold halves 80, 82, the mold halves 80, 82 are opened, the blow body is removed and separated along a separating line 92 on the flange 16 into the individual lower container 12 and upper container 14 and later on joined to each other with the aid of the clamping devices 17 in a fluid-tight manner.

Figure 12:
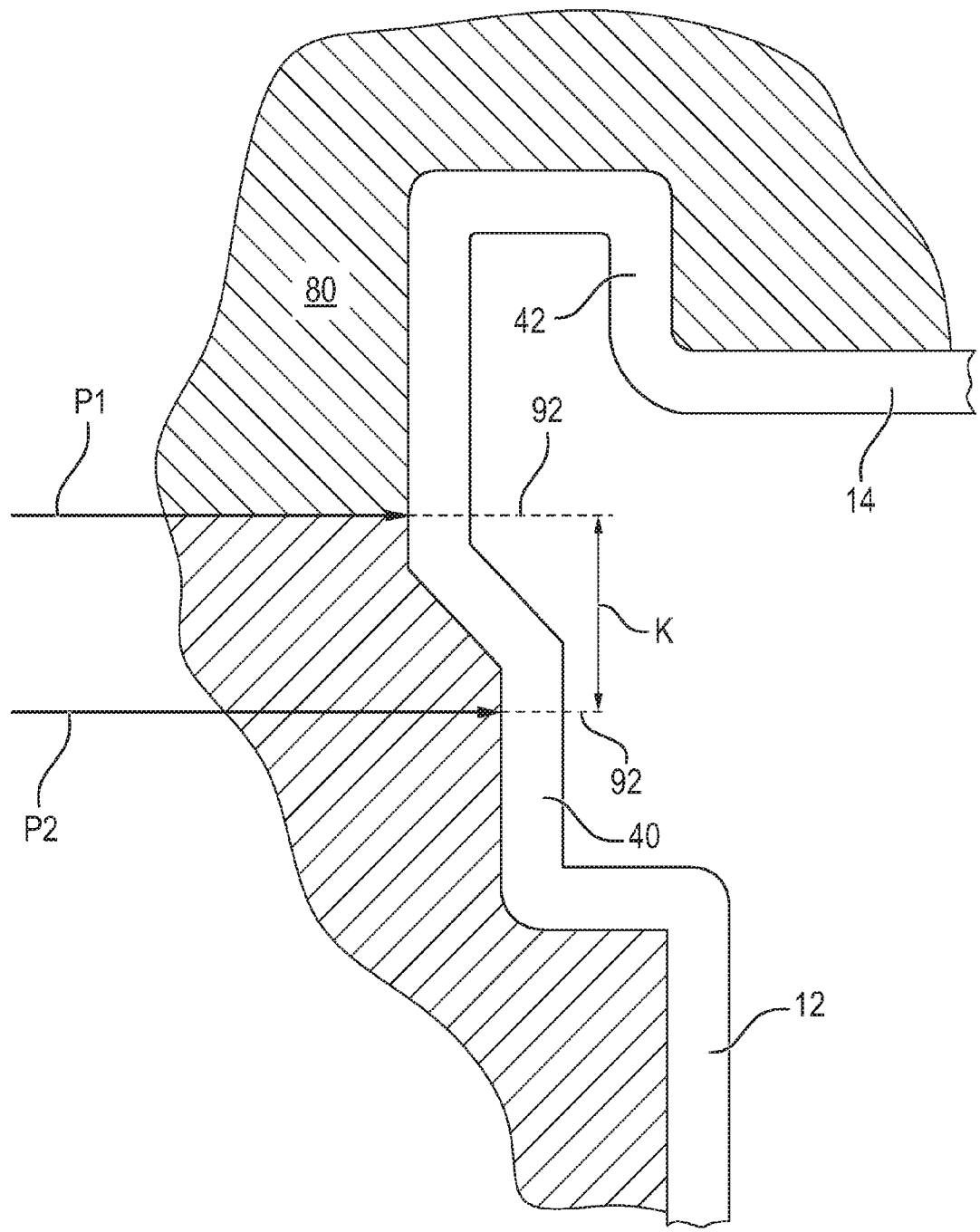
FIG. 12 shows a detailed view with L section, U section and a mold waste.

FIG. 12 shows in a detailed view a section through the mold half 80 in the separating area between the upper container 14 and the lower container 12. By way of blow molding, the plastic material of the preform 84 adapts to the inner contour of the mold half 80 and forms the circumferential U section 42 and the circumferential L section 40. After removal of the container parts 12, 14 from the mold halves 80, 82, and after separation, the ring-shaped plastic material K is removed along the arrows P1, P2 and ground as mold waste just as the slugs 88, 90 and is fed for reuse.

The invention claimed is:

1. A waste water container (10) made of plastic with a receiving volume of 2000 to 10000 liters comprising:
an upper container part (14) with a wall and a lower container part (12) with a wall and at least one clamping device (17) connecting the two container parts (12, 14) to one another in a sealing manner, characterized in that the clamping device (17) comprises a U-shaped clamping bracket (46) with a first leg (48) having an inside and a second leg (50), wherein an end of the first leg (48) encompasses an underside of an L section (40) of the lower container part (12) and an end of the second leg (50) encompasses a U section (42) of the upper container part (14);
wherein from the container wall of the lower container part (12) a circumferential projecting L section (40) penetrates into a circumferential U section (42) of the upper container part (14) associated therewith; wherein the container (10) further is characterized in that between the second leg (50) and the U section (42) a clamping element (54) is movably arranged relative to the U section (42), wherein the clamping element (54) has a wedge-shaped clamping surface (58) interacting for clamping with a wedge-shaped clamping surface (60) formed on the second leg (50).

2. The container (10) according to claim 1, characterized in that the underside (62) of the L section (40) has at least one projection (64) with a wedge-shaped clamping surface (66) which upon clamping interacts with a wedge-shaped clamping surface (68) formed on the inside of the first leg (48) of the clamping bracket (46).

3. The container (10) according to claim 2, characterized in that a reinforcing material (56) made of plastic or metal is present between the clamping device (17) and the U section (42).

4. The container (10) according to claim 3, characterized in that polyethylene is provided as the plastic material.

5. The container (10) according to claim 4, characterized in that both container parts (12, 14) are produced by blow molding, rotational molding or thermoforming.

6. The container (10) according to claim 5, characterized in that the lower container part (12) has conically extending tapered longitudinal walls (32) and conically extending tapered side walls (34).

7. The container (10) according to claim 6, characterized in that the taper of the side walls (34) of the lower container part (12) is greater than the taper of the two longitudinal walls (32) of the lower container.

8. The container (10) according to claim 7, characterized in that the container assembled from part (12 and 14) has liquid level and the L section (40) is formed on the lower container part (12) and is situated above the liquid level in the container (10) when the container (10) is in use.

9. The container (10) according to claim 8, characterized in that a feed (22) is arranged in the upper container part (14).

10. The container (10) according to claim 9, characterized in that an overflow (20) for a liquid present in the container (10) comprising and assembled from parts (12 and 14) is arranged below the L section (40).

11. The container (10) according to claim 10, characterized in that the upper container part (14) is produced together with the lower container part (12) in one single operation by a blow molding process.

12. The container (10) according to claim 11, characterized in that a pinch-off seam (30) of the assembled container (10) comprising parts (12 and 14) produced by the blow molding process is arranged on the lower container part (12) on the two narrow sides (34).

13. The container (10) according to claim 12, characterized in that the pinch-off seam (30) terminates below the L section (40) of the lower container part (12).

* * * * *